United States Patent [19]

Casberg

[11] 4,444,316

[45] Apr. 24, 1984

[54] GAS SCAVENGER AGENTS FOR CONTAINERS OF SOLID CHLOROISOCYANURATES

[75] Inventor: John M. Casberg, Cheshire, Conn.

[73] Assignee: Olin Corporation, New Haven, Conn.

[21] Appl. No.: 414,277

[22] Filed: Sep. 3, 1982

[51] Int. Cl.$^3$ .................. B65D 81/24; C09K 3/00
[52] U.S. Cl. .................. 206/524.4; 206/205; 252/189; 252/186.35; 252/187.34; 252/190; 252/192; 252/181.1; 252/181.2; 252/181.7; 252/10; 252/94; 252/99; 252/176
[58] Field of Search .................. 252/186.35, 187.34, 252/189, 190, 192, 181.1, 181.2, 181.7, 10, 94, 99, 176; 206/524.4, 205

[56] References Cited

U.S. PATENT DOCUMENTS

| | | | |
|---|---|---|---|
| 3,061,549 | 10/1962 | Dickey | 252/90 |
| 3,990,872 | 11/1976 | Cullen | 55/274 |
| 4,149,988 | 4/1979 | Brennan et al. | 252/187 |
| 4,334,610 | 6/1982 | Ota et al. | 206/205 |
| 4,389,325 | 6/1983 | Eng et al. | 252/99 |

*Primary Examiner*—Benjamin R. Padgett
*Assistant Examiner*—Anne Brookes
*Attorney, Agent, or Firm*—James B. Haglind; Donald F. Clements

[57] ABSTRACT

Chlorine-containing gases which may be formed in containers of solid chloroisocyanurates such as trichloroisocyanuric acid are adsorbed and decomposed by a gas scavenging agent consisting essentially of silica gel, an alkali metal bicarbonate, and carbon. The gas scavenger is preferably enclosed in a gas permeable spun-bonded polyolefin envelope. The scavenging agent adsorbs moisture, absorbs and decomposes nitrogen trichloride, removes chlorine, and neutralizes hydrogen chloride formed. The gas scavenging mixture is physically compatible and readily blended while minimizing dusting during packaging operations.

20 Claims, No Drawings

GAS SCAVENGER AGENTS FOR CONTAINERS OF SOLID CHLOROISOCYANURATES

This invention relates to improved packaging for solid chloroisocyanurate compositions used as dry sanitizing and disinfecting agents.

Chloroisocyanurates such as trichloroisocyanuric acid have a degree of instability which, for example, in the presence of moisture or heat results in their decomposition. This decomposition includes the evolution of highly noxious and otherwise objectionable chlorine-containing gases such as nitrogen trichloride, chlorine, and mixtures thereof.

To inhibit the decomposition of solid chloroisocyanurate compositions, stabilizing agents or decomposition inhibitors have been added. For example, materials such as mixtures of manganese dioxide and cupric oxide, activated alumina, activated carbon, zeolites, bentonite, alkali metal silicates, alkali metal hydroxides, potassium carbonate, rubidium carbonate or cesium carbonate, or alkaline earth oxides are described as suitable deodorants in U.S. Pat. No. 3,061,549 issued to M. L. Dickey. Included among these materials are those which are potentially reactive with chloroisocyanurates such as the hydroxides and carbonates as well as those which are moisture sensitive, for example, alkali metal silicates and carbonates and alkaline earth metal oxides. These deodorants may be enclosed in packages such as perforated bags of polyethylene plastic or permeable bags such as tea bags and enclosed in a container filled with the solid chloroisocyanurate.

U.S. Pat. No. 4,146,578 issued Mar. 27, 1979, to J. P. Brennan, J. M. Casberg, and C. H. Putnam teaches decomposition inhibitors for solid chloroisocyanurates containing an alkaline earth metal sulfate or mixtures of an alkaline earth metal sulfate with an alkali metal bicarbonate or an alkali metal sulfite. Moisture resistant packages are produced by introducing a cartridge or container of the solid chloroisocyanurate into a polyethylene bag to which the decomposition inhibitor had been added.

A gas scavenger package employing a gas permeable spun-bonded polyolefin envelope enclosing as a gas scavenging composition for chlorine-containing gases a mixture of an alkaline earth metal sulfate, an alkali metal bicarbonate, and carbon is described in application U.S. Ser. No. 262,572, filed May 11, 1981 by J. M. Casberg et al. While this mixture is effective as a gas scavenging agent, the components do not readily blend in commercially available mixing apparatus to form a homogeneous mixture. This is due primarily to the components having, for example, different commercially available particle sizes. In particular, to produce a suitable blend while minimizing the size of the package employed, it is necessary to employ particles of the alkaline earth metal sulfate which have a limited size range and which tend to make the mixture dusty. In addition, it is desirable to improve the chlorine-gas containing absorbability of the gas scavenging mixture.

It is therefore desirable to provide a gas scavenger package for containers of solid chloroisocyanurates which permits optimizing packaging operations by eliminating or minimizing blending and handling problems.

It is an object of the present invention to provide a gas scavenging agent for chlorine-containing gases which is effective in inhibiting and neutralizing noxious gases in containers of solid chloroisocyanurates.

Another object of the present invention is to provide as a gas scavenging agent a mixture which is readily blended and physically compatible.

A further object of the invention is to provide a gas permeable package while minimizing or eliminating dusting during packaging operations such as blending and filling.

An additional object of the present invention is to provide a gas permeable package of optimum size and which will permit gases to enter the package while preventing loss of the gas scavenging agent through leaking or dusting.

These and other objects of the invention are accomplished in a gas scavenging composition consisting essentially of a mixture of silica gel, an alkali metal bicarbonate, and carbon.

More in detail, solid chloroisocyanurate compositions include those containing trichloroisocyanuric acid, dichloroisocyanuric acid, salts of dichloroisocyanuric acid such as alkali metal dichloroisocyanurates and alkaline earth metal dichloroisocyanurates as well as complexes and mixtures thereof. Preferred solid chloroisocyanurate compositions are trichloroisocyanuric acid and alkali metal dichloroisocyanurates, with trichloroisocyanuric acid being particularly preferred. The solid chloroisocyanurates can be in any suitable form including granular or compressed forms such as tablets, rings, briquets, sticks, etc.

Solid chloroisocyanurate compositions are shipped and sold in a variety of containers including drums, bottles, cans, boxes, etc. The containers are closed, but are not completely sealed to allow escape of gases formed by any decomposition which might take place and prevent a buildup of gas pressure within the container.

Dry solid chloroisocyanurates are sensitive to moisture and heat and in their presence decomposition may take place resulting in the formation of noxious gases including chlorine, nitrogen trichloride, and often hydrogen chloride. While the exact mechanism of noxious gas formation within the containers of solid chloroisocyanurates is unknown, and not wishing to be bound by theory, it is believed that moisture present in the product or entering the container hydrolyzes the chlorisocyanurate to initially form hypochlorous acid. Hypochlorous acid reacts with additional chlorisocyanurate to produce nitrogen trichloride. Subsequent decomposition of nitrogen trichloride forms chlorine. Carbon dioxide gas is also formed during the decomposition of solid chloroisocyanurates. While not reactive with the compounds, its presence increases the gas pressure within the container. Hydrogen chloride is believed to be formed by the reaction of chlorine present with certain packaging materials, for example, polyolefins.

The novel gas scavenging composition of the present invention interacts with these decomposition products to decompose nitrogen trichloride to chlorine and nitrogen gases, absorb the chlorine formed, and neutralize any hydrogen chloride which is formed.

The gas scavenging composition of the present invention consists essentially of a mixture of silica gel, an alkali metal bicarbonate, and carbon. Each of these ingredients is employed in a particulate form of the solid.

Silica gel particles of the type which are commercially known as regular density (RD) are quite suitable although silica gel particles of intermediate density or low density may be employed if desired. Suitable silica gel particle sizes include those in the range of from about 70 to about 800, and preferably from about 85 to about 425 microns.

Alkali metal bicarbonates which can be employed in the gas scavenging compositions include sodium bicarbonate or potassium bicarbonate, with sodium bicarbonate being a preferred embodiment. Alkali metal bicarbonates remove and inactivate chlorine and hydrogen chloride gases. Suitable particle sizes for the anhydrous bicarbonate particles include those in the range of from about 40 to about 300 and preferably from about 80 to about 200 microns.

The third ingredient of the gas scavenging composition, carbon, is employed as substantially anhydrous porous particles which may be either unactivated or activated, with activated carbon particles being preferred. Carbon granules employed are those having substantial amounts of internal and external surface area which adsorb chlorine and carbon dioxide and promote the decomposition of nitrogen trichloride. The granules may have any suitable particle sizes, for example, those in the range of from about 100 to about 1000 microns, and preferably from about 175 to about 700 microns.

The carbon particles may be coated or impregnated with metal salts such as those of copper, nickel, cobalt, and chromium including, for example, the chlorides, sulfates, nitrates, oxides, or hydroxides of these metals. Preferred as coatings or impregnants are metal salts of cobalt, nickel, or copper which are more soluble in water such as cobalt chlorides, cobalt sulfates, cobalt nitrates, nickel chlorides, nickel sulfates, nickel nitrates, copper chlorides, copper sulfates, copper nitrates, and mixtures thereof with cobalt chlorides, nickel chlorides, copper chlorides, and mixtures thereof being particularly preferred.

The gas scavenging compositions of the present invention may include a wide range of component ratios to effectively remove and inactivate noxious chlorine-containing gases. Suitably the gas scavenging compositions contain at least 5 percent by weight of each of the components. Preferably, the silica gel, the alkali metal bicarbonate, and carbon are each present in at least 10 percent by weight. More preferably, the gas scavenging composition of the present invention contains at least 20 percent by weight of each of the three components. For example, where the solid chloroisocyanurate is trichloroisocyanuric acid, the gas scavenging composition may contain preferably at least 10 percent by weight of carbon and the silica gel and the alkali metal bicarbonate each in amounts in the range of from about 10 to about 80 percent by weight. When the solid chlorisocyanurate is an alkali metal salt of dichloroisocyanuric acid such as sodium dichloroisocyanurate dihydrate, the portion of silica gel can be reduced and preferred component weight ratios include those in which the silica gel is at least 10 percent by weight and the alkali metal bicarbonate and carbon are each present in amounts in the range of from about 10 to about 80 percent by weight. The cumulative total being, of course, no greater than 100 percent.

The novel gas scavenging compositions of the present invention may be admixed directly with the solid chloroisocyanurate, for example, by introducing the compositions into the container. Where this method is used, the solid chloroisocyanurate is preferably in a compressed form such as that of a tablet, stick, or briquet.

Any amounts of the gas scavenging compositions may be employed which will effectively remove moisture and render innocuos noxious gases which may be formed. For example, commercially produced trichloroisocyanuric acid has a moisture content of about 0.2 percent and preferably less than 0.1 percent by weight of water. Suitable amounts of the gas scavenging compositions admixed with commercial trichloroisocyanuric acid include those in the range of from about 0.5 to about 10, preferably from about 0.8 to about 6, and more preferably from about 1 to about 4 percent by weight of said trichloroisocyanuric acid.

Containers for solid chloroisocyanurates, e.g., drums, bottles, cans, etc. are tightly closed but have not been, for example, hermetically sealed as allowance is made for permitting the release of gases of decomposition which may be formed. Gaseous decomposition products are formed, for example, during storage periods under conditions of elevated temperatures and humidity. Where chlorine-containing gases are produced, their attack on the containers may result in embrittlement and loss of strength, for example, in plastic containers. In addition, the colors of components such as caps and labels may be bleached out or discolored by the action of $Cl_2$ or $NCl_3$. Where boxes or cartons are used to ship smaller containers of solid chloroisocyanurates, materials of construction such as fiber wood are significantly weakened and rapidly deteriorate in the presence of these chlorine-containing gases. Further the release of these gases is irritating to the users.

In a preferred embodiment, the gas scavenging composition is enclosed in a gas permeable package which is deposited in the container of solid chloroisocyanurate. The package is fabricated from spun-bonded olefin which comprises fibers of polyolefins such as polyethylene or polypropylene which are combined by an integrated spinning and bonding process. This packaging material is permeable to chlorine-containing gases such as nitrogen trichloride or chlorine which may be produced during the decomposition of solid chloroisocyanurates by the action of heat and/or moisture. Water vapor and carbon dioxide gas may also pass through the gas permeable packaging material to contact the gas scavenging agent. Nitrogen gas, which is formed by decomposition of nitrogen trichloride by the gas scavenging agent, may pass through the gas permeable packaging material into the outer container of solid chloroisocyanurate. Spun-bonded polyolefins are inert to the action of chlorine-containing gases and are not bleached or weakened upon contact with these chlorine-containing gases.

As a preferred embodiment, the envelope is fabricated from spun-bonded high density polyethylene fabrics.

The gas permeable package may be fabricated, for example, by coating one side or a portion thereof of a sheet of spun-bonded high density polyethylene with a sealing improvement agent. The sheet is then folded to produce two panels which contact each other along the coated portions. Two edges of the folded sheet are then sealed, for example, by heat sealing along the coated portions to form an envelope open along the third edge. The gas scavenging agent is added to the envelope through the open end and the third edge sealed to form a sealed gas permeable package.

In one embodiment of the present invention, the envelope of the gas permeable package is formed by sealing a section of spun-bonded high density polyethylene to a section of a substantially gas impermeable material such as thermoplastic film. Suitable examples include polyolefins such as polyethylene, polypropylene and polytetrafluoroethylene; as well as polyesters or nylon.

While any method of sealing may be employed to bond the spun-bonded polyolefin to itself or to other materials used in the gas permeable package, it has been found advantageous to employ heat sealing as the preferred bonding method. As stated above, heat sealing is preferably employed after coating one side of the packaging material with a sealing improvement agent. To maintain suitable gas permeability, only a portion of one side need be coated, namely those areas in which heat sealing will occur. Suitable sealing improvement agents include materials which are compatible with spun-bonded polyolefins such as ethylene vinyl acetate-based resins, polyolefin-based resins, polyvinyl chloride-based resins, and polyvinyl chloride-polyvinyl acetate mixtures. These sealing improvement agents are applied, for example, as aqueous emulsions or latices. While any amounts of the sealing improvement agent may be used to coat the packaging material, it is preferred that light-weight coats be applied, for example, those in the range of from about 1 to about 7 pounds and preferably from about 3 to about 5 pounds of sealing improvement agent per ream of packaging material.

Heat sealing can be carried out using commercially available equipment and employing known conditions, e.g, sealing temperatures, pressures, and sealing times. Suitably sealed gas permeable packages have a peel strength in the range of from about 0.5 to about 20 pounds per inch and preferably of from about 2 to about 10 pounds per inch.

Gas permeable packages of the present invention have an air permeability in the range of from about 10 to about 3000 seconds and preferably from about 20 to about 1200 seconds per 100 cm$^3$ of air per square inch.

Packages of the gas scavenging compositions of the present invention may also be used in containers of products including solid chloroisocyanurates as a component. For example, containers of detergent mixtures, sanitizing compositions, cleansing agents, and bleaching compositions in which solid chloroisocyanurates are used as a source of available chlorine are protected from damage and the release of noxious chlorine-containing gases by the inclusion of a package of the novel gas scavenging compositions of the present invention.

Suitable packages of these compositions may also be used in air filtering or purifying equipment which is employed in areas in which chlorine-containing gases such as nitrogen trichloride are produced.

The novel gas scavenging compositions of the present invention when enclosed in containers of solid chloroisocyanurates effectively inhibit the accumulation or release of moisture in the container. Chlorine-containing gases such as chlorine are adsorbed while nitrogen trichloride is both adsorbed and decomposed. Further, the gas scavenging compositions neutralize acidic gases such as hydrogen chloride which may be formed. Containers for solid chloroisocyanurates enclosing the gas scavenging compositions can be sealed more tightly as the accumulation of gases in the container and hence the internal gas pressure is significantly reduced. A tighter seal reduces the amount of moisture vapor and atmospheric gases which can enter the container. If the container's seal is defective, the gas scavenging compositions will prevent excessive decomposition of the solid chloroisocyanurates contained within.

Employing the novel gas scavenging composition prevents embrittlement of the container itself as well as inhibiting bleaching of container components such as caps and labels.

The novel gas scavenging compositions of the present invention are further illustrated by the following examples without any intention of being limited thereby. All percentages are by weight unless otherwise specified.

EXAMPLE 1

Pouches of spun-bonded high density polyethylene (E. I. DuPont De Nemours & Co.—TYVEK ® Type 10 spun-bonded olefin, fabric weight 74.6 gms./sq. meter) coated on one side with an ethylene polyvinylacetate resin (Pierce and Stevens A 7911) were filled with 35 grams of a gas scavenging composition. Two pouches were filled with a mixture of 2 parts by weight of silica gel, 2 parts by weight of sodium bicarbonate and 1 part by weight of carbon. Each pouch was placed in a polyethylene bottle containing 8.8 kilograms of tablets of trichloroisocyanuric acid to which had been added 5.5 mls. of water to accelerate the liberation of $Cl_2$ and $NCl_3$. The bottles were sealed with plastic caps having an orange color (Pigment KI 1540A) which is easily bleached by chlorine-containing gases. Cardboard was wrapped around each of the bottles. The initial indentation strength of the cardboard was greater than 44 kilograms as measured using a Chatillon Tester. The cardboard wrapped bottles of tablets were each placed in a polyethylene bag and the bag closed. As a control, 2 bottles containing 8.8 kilograms of trichloroisocyanuric acid tablets and 5.5 mls. of water, each without a gas permeable package containing a gas scavenging agent, were wrapped in cardboard and placed in polyethylene bags. The bags containing the bottles of tablets were placed in a room maintained at 37.8° C. and a relative humidity of 85%. Periodically the polyethylene bags were opened and the cardboard and caps visually examined for indications of bleaching and the indentation strength of the cardboard was determined. In Table I below is recorded the day on which the plastic cap was found to be bleached white. Also recorded in Table I is the day on which the indentation strength was less than 22 kilograms, indicating that the cardboard was no longer suitable for use. The data recorded in Table I is the average for the two packages.

COMPARATIVE EXAMPLES A AND B

The procedure of EXAMPLE 1 was repeated exactly with the exception that in COMPARATIVE EXAMPLE A, the gas scavenging agent was silica gel; and in COMPARATIVE EXAMPLE B, the gas scavenging agent was a mixture of equal weight portions of silica gel and sodium bicarbonate. The test data obtained, the average of each of the two packages for each gas scavenging agent, is recorded in Table I below.

TABLE I

| Gas Scavenging Agent (wt. ratio) | Bottle Cap Bleached After (Days) | Cardboard Indentation Strength <22 Kgs After (Days) |
|---|---|---|
| Example 1- | 62 | 62 |

TABLE I-continued

| Gas Scavenging Agent (wt. ratio) | Bottle Cap Bleached After (Days) | Cardboard Indentation Strength <22 Kgs After (Days) |
| --- | --- | --- |
| Silica Gel/NaHCO$_3$/C (2:2:1) Control - None | 2 | 5 |
| Comparative Example A - Silica Gel | 5 | 23 |
| Comparative Example B - Silica Gel/NaHCO$_3$ (1:1) | 23 | 43 |

EXAMPLE 1 shows that the novel gas scavenging agent of the present invention significantly reduces both the bleaching of the bottle cap and the loss of strength of cardboard by chlorine-containing gases formed in the trichloroisocyanuric acid containers when compared with the individual components of the mixtures.

EXAMPLE II

The gas scavenging agent of EXAMPLE 1 was prepared by adding to a container 14 grams of NaHCO$_3$, having a particle size range of about 100 to about 250 microns; 14 grams of silica gel, having a particle size range of about 90 to about 420 microns; and 7 grams of carbon having a particle size range of about 175 to about 600 microns. The container was rotated on a blender for about 2 minutes and a homogeneous mixture obtained. The gas scavenger agent was found to be non-dusting by inverting the container and visually observing the gas in the head space. Upon turning the bottle, the mixture flowed instantly, indicating a free-flowing mixture.

I claim:

1. In a container for a solid chloroisocyanurate composition, the improvement which comprises enclosing therein a gas scavenging agent consisting essentially of a mixture of silica gel, an alkali metal bicarbonate, and carbon, wherein each of the components of the mixture is present in at least 5 percent by weight.

2. The container of claim 1 in which said solid chloroisocyanurate is selected from the group consisting of trichloroisocyanuric acid, dichloroisocyanuric acid, alkali metal salts of dichloroisocyanuric acid, alkaline earth metal salts of dichloroisocyanuric acid, and mixtures thereof.

3. The container of claim 2 in which said gas scavenging composition is contained in a sealed, gas permeable package.

4. The container of claim 3 in which said mixture comprises at least 10 percent by weight of each of said silica gel, said alkali metal bicarbonate, and said carbon.

5. The container of claim 4 in which said alkali metal bicarbonate is anhydrous sodium bicarbonate.

6. The container of claim 5 in which said carbon has a particle size range of from about 175 to about 700 microns.

7. The container of claim 6 in which said solid chloroisocyanurate is trichloroisocyanuric acid.

8. The container of claim 7 in which the amount of said gas scavenging agent is from about 0.5 to about 10 percent by weight of said solid chloroisocyanurate.

9. The container of claim 8 in which compressed form of said solid chloroisocyanurate is selected from from the group consisting of tablets, rings, briquets, and sticks.

10. The container of claim 2 in which said carbon is coated with a metal salt selected from the group consisting of copper salts, cobalt salts, nickel salts, chromium salts, and mixtures thereof.

11. A gas scavenger package comprised of a gas permeable spun-bonded polyolefin envelope sealingly enclosing therein a gas scavenging composition for chlorine-containing gases consisting essentially of a mixture of silica gel, an alkali metal bicarbonate, and carbon.

12. The gas scavenger package of claim 11 in which said spun-bonded polyolefin is selected from the group consisting of polypropylene and polyethylene.

13. The gas scavenger package of claim 12 in which the permeability is in the range of about 10 to about 3000 seconds per 100 cm$^3$ of air per square inch.

14. The gas scavenger package of claim 13 in which said polyolefin is high density polyethylene.

15. The gas scavenger package of claim 14 in which said alkali metal bicarbonate is selected from the group consisting of sodium bicarbonate, potassium bicarbonate, and mixtures thereof.

16. The gas scavenger package of claim 11 in which a portion of said package is comprised of a substantially gas impermeable film selected from the group consisting of a polyolefin, a polyester, or a nylon.

17. The gas scavenger package of claim 16 in which said gas impermeable film is a polyester.

18. A container for a solid chloroisocyanurate composition having enclosed therein the gas scavenger package of clam 17.

19. The container of claim 18 in which said container is selected from the group consisting of drums, bottles and cans and said solid chloroisocyanurate is trichloroisocyanuric acid.

20. The container of claim 19 in which said chlorine-containing gases are selected from the group consisting of chlorine, nitrogen trichloride, hydrogen chloride, and mixtures thereof.

* * * * *